US010334000B2

(12) United States Patent
Darabiha et al.

(10) Patent No.: US 10,334,000 B2
(45) Date of Patent: Jun. 25, 2019

(54) ENHANCEMENT TO AUTONOMOUSLY EXECUTED APPLICATIONS

(71) Applicant: Rovio Entertainment Ltd, Espoo (FI)

(72) Inventors: Ramine Darabiha, Helsinki (FI); Miaoqing Tan, Helsinki (FI); Joonas Jokela, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 996 days.

(21) Appl. No.: 14/378,846

(22) PCT Filed: Feb. 13, 2013

(86) PCT No.: PCT/FI2013/050159
§ 371 (c)(1),
(2) Date: Aug. 14, 2014

(87) PCT Pub. No.: WO2013/121106
PCT Pub. Date: Aug. 22, 2013

(65) Prior Publication Data
US 2016/0014167 A1    Jan. 14, 2016

(30) Foreign Application Priority Data

Feb. 14, 2012    (FI) ...................................... 20125163

(51) Int. Cl.
*G06F 3/048*        (2013.01)
*H04L 29/06*        (2006.01)
(Continued)

(52) U.S. Cl.
CPC ............ *H04L 65/403* (2013.01); *A63F 13/35* (2014.09); *A63F 13/49* (2014.09); *A63F 13/79* (2014.09);
(Continued)

(58) Field of Classification Search
CPC ...... G06F 21/554; G06F 11/28; G06F 21/552; A63F 13/213; A63F 13/217; A63F 13/25;
(Continued)

(56) References Cited

U.S. PATENT DOCUMENTS

| 6,360,254 B1 | 3/2002 | Linden et al. |
| 7,325,042 B1 | 1/2008 | Soscia et al. |

(Continued)

FOREIGN PATENT DOCUMENTS

| GB | 2 368 678 A | 5/2002 |
| TW | 201145961 A | 12/2011 |

(Continued)

OTHER PUBLICATIONS

Khaled Reza et al., Generating activity streams from events occurring in company-internal IT infrastructures; 2011, IEEE; 6 pages.*
(Continued)

*Primary Examiner* — Linh K Pham
(74) *Attorney, Agent, or Firm* — Squire Patton Boggs (US) LLP

(57) ABSTRACT

An enhancement to autonomously executed applications, based on inter-related co-operation of a user terminal (10) and a server (14) or a server cloud. The server (14) maintains user-specific conditions and uses the condition to extract from a stream of event data items information to a user-specific feed. This feed is made available via a user-specific web address. A user-initiated pause in the user terminal (10) triggers the terminal application to generate and invoke the user-specific web address such that topical feed information generated from recent events of other users and user applications becomes accessible. User experience of autonomously executed applications can be enhanced without essentially compromising the independency of the processing stage.

15 Claims, 6 Drawing Sheets

(51) Int. Cl.
*G06F 16/958* (2019.01)
*G06Q 30/02* (2012.01)
*A63F 13/35* (2014.01)
*A63F 13/49* (2014.01)
*A63F 13/79* (2014.01)
*G06F 3/0484* (2013.01)

(52) U.S. Cl.
CPC .......... *G06F 3/0484* (2013.01); *G06F 16/958* (2019.01); *G06F 16/972* (2019.01); *G06Q 30/02* (2013.01); *H04L 65/60* (2013.01)

(58) Field of Classification Search
CPC ...... A63F 13/5375; A63F 13/79; A63F 13/90; A63F 3/00157; A63F 9/04; A63F 13/12; A63F 2300/556; A63F 2300/575
See application file for complete search history.

(56) References Cited

U.S. PATENT DOCUMENTS

| | | | |
|---|---|---|---|
| 8,996,625 B1* | 3/2015 | Singleton | H04L 29/06 707/771 |
| 2004/0078263 A1 | 4/2004 | Altieri | |
| 2004/0205698 A1* | 10/2004 | Schliesmann | H04N 5/44513 717/106 |
| 2006/0068861 A1 | 3/2006 | Triestram et al. | |
| 2007/0157118 A1 | 7/2007 | Wuttke | |
| 2009/0099928 A1 | 4/2009 | Vasile | |
| 2009/0157500 A1 | 6/2009 | Ames et al. | |
| 2009/0193101 A1* | 7/2009 | Munetsugu | G11B 27/034 709/219 |
| 2010/0057682 A1 | 3/2010 | Ramsay, Jr. et al. | |
| 2010/0211448 A1 | 8/2010 | Beenau et al. | |
| 2010/0229106 A1* | 9/2010 | Lee | A63F 13/12 715/757 |
| 2011/0053583 A1 | 3/2011 | Parmar et al. | |
| 2011/0276396 A1* | 11/2011 | Rathod | G06F 17/30867 705/14.49 |
| 2012/0113264 A1* | 5/2012 | Moshrefi | H04H 20/38 348/157 |
| 2012/0142428 A1* | 6/2012 | Wilson | A63F 13/216 463/42 |
| 2012/0150971 A1* | 6/2012 | Bahrainwala | G06Q 10/107 709/206 |
| 2012/0197980 A1* | 8/2012 | Terleski | G06Q 50/01 709/203 |
| 2012/0214575 A1* | 8/2012 | Amaitis | G06Q 50/34 463/25 |
| 2012/0282951 A1* | 11/2012 | Nguyen | H04L 65/4015 455/457 |

FOREIGN PATENT DOCUMENTS

| | | |
|---|---|---|
| WO | 2008/021097 A2 | 2/2008 |
| WO | 2008/021098 A2 | 2/2008 |
| WO | 2008/058276 A2 | 5/2008 |

OTHER PUBLICATIONS

Search Report dated Nov. 22, 2012, issued in corresponding FI Patent Application No. 20125163.
International Search Report dated Jan. 22, 2014, issued in corresponding International Application No. PCT/FI2013/050159.
Hongzhou Liu et al., "Client Behavior and Feed Characteristics of RSS, a Publish-Subscribe System for Web Micronews", Proceedings of the 5th ACM SIGCOMM Conference on Internet Measurement, Oct. 19, 2005 (pp. 29-34).
Donghee Yvette Wohn et al., "The "S" in Social Network Games: Initiating, Maintaining, and Enhancing Relationships", System Sciences (HICSS), 2011 44th Hawaii International Conference on, IEEE, Jan. 4, 2011 (pp. 1-10).

* cited by examiner

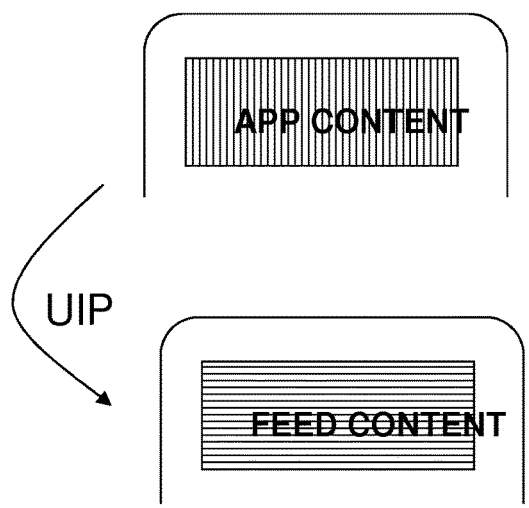
Figure 4A
Figure 4B
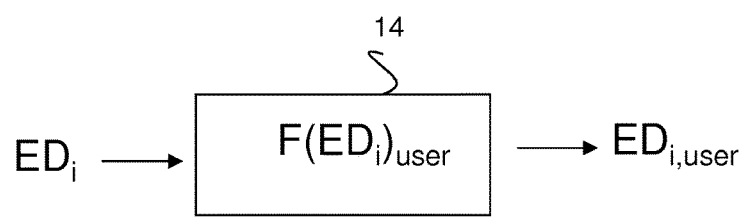
Figure 5
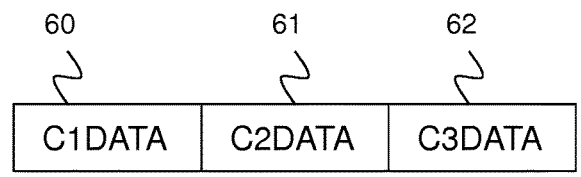
Figure 6

ENHANCEMENT TO AUTONOMOUSLY EXECUTED APPLICATIONS

FIELD OF THE INVENTION

The present invention relates to information systems and more specifically to a method, a device and a computer program product with an enhancement to autonomously executed applications, as defined in the preambles of the independent claims.

BACKGROUND OF THE INVENTION

User applications may be differentiated according to the level of independency of their execution. Some applications are designed to run locally in a user terminal according to control operations of the user. Information may be exchanged with a remote server, but the exchanged information is not mandatory for the execution of the application. On the other hand, some applications are designed for a plurality of users that participate to execution of the application via a remote server, or a cloud or servers. Application events are continuously updated to all user terminals that participate to the execution and the participants share the same user experience.

The difference between these two application types may be exemplified with game applications. Some games are networked online games where players enter a same gaming sphere and share the game events therein. Other games are autonomously executed games that are installed into a user terminal and then run in the local device environment interacting with the local user or users only.

Many users prefer autonomously executed applications over online applications, because they appreciate the associated independency. An autonomous user is not dependent on availability of network coverage, and does not need to worry about the amount of data exchanged with an application server. The user may enter and exit the application according to his or her own will and state and the level of use remains private.

However, it has been noted that with some autonomously executed applications could be enhanced with some level of shared user experience. Interaction with other users brings in additional social aspect and thereby increases interest to the application and involves users more regularly. It is hoped that at least part of the attractions of the online games could be introduced to the autonomously running applications without, however, compromising the independency of the user experience.

Some autonomously running applications already provide further interactive elements for their users. For example, in some social media platforms, users registering to play a game may be informed about their friends that have registered to play the same game. When the user plays the game, an additional ticker window may be opened to inform whether the friend also plays or played the game. In addition, in the beginning or end of the game, the high score of the friend may be given to the user. The given information relates, however, only to the game and level in which the user presently is. A broader view to other levels and even other games would be appreciated by the players, and by the application providers. Since an important user base of autonomously processed applications is in mobile applications it is, however, important that any possible enhancements could be easily implemented without major adjustments also to the limited display means of mobile devices.

BRIEF DESCRIPTION OF THE INVENTION

The object of the present invention is to enhance user experience of autonomously executed applications without essentially compromising the independency of the processing stage. The objects of the present invention are achieved with a device, a system, a method and a computer program product according to the characterizing portions of the independent claims.

The preferred embodiments of the invention are disclosed in the dependent claims.

The present invention is based on inter-related co-operation of a terminal application in a user terminal and a server application in a server or a server cloud. The server maintains user-specific conditions and uses the condition to extract from a stream of event data items information to a user-specific feed. This feed is made available via a user-specific web address. A user-initiated pause in the user terminal triggers the terminal application to generate and invoke the user-specific web address such that topical feed information generated from recent events of other users and user applications becomes accessible.

The present invention has the advantage that the enhancement may be provided without increasing reliance to continuous information exchange between user terminals and the application server. Furthermore, the arrangement is well applicable also to restricted display means of mobile user terminals.

BRIEF DESCRIPTION OF THE FIGURES

In the following the invention will be described in greater detail, in connection with preferred embodiments, with reference to the attached drawings, in which
FIGS. 4A and 4B illustrate output windows of a user terminal;
FIG. 5 illustrates the basic operating principle of the application server;
FIG. 6 illustrates an example of an event data item.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are generally known to a person skilled in the art and may not be specifically described herein.

Figure 1:
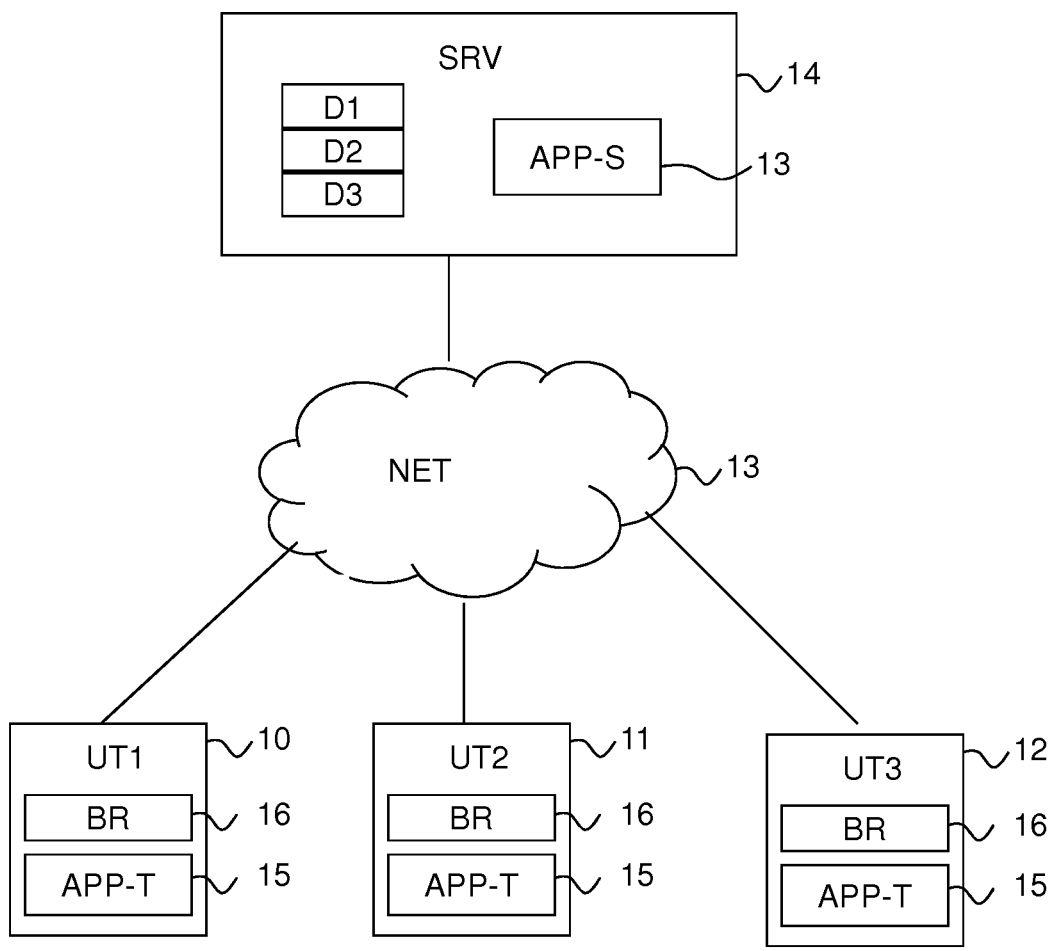
FIG. 1 illustrates an exemplary network system.

FIG. 1 illustrates an exemplary network system in which an embodiment of the present invention may be implemented. The shown network system comprises one or more user terminals 10, 11, 12, a network 13 and a server 14. The network 13 represents here any combination of hardware and software components that enables a process in one communication endpoint to send or receive information to or from another process in another, remote communication endpoint. The network 13 may be, for example, a personal area network, a local area network, a home network, a storage area network, a campus network, a backbone network, a metropolitan area network, a wide area network, an enterprise private network, a virtual private network, or an internetwork, or a combination of any of these. At least one of the user terminals 10, 11, 12 comprises a terminal application APP-T 15.

The terminal application 15 is an autonomously processed user controllable application that is, or may be stored in a memory of a user terminal and provides instructions that, when executed by a processor unit of the user terminal perform the functions described herein. The expression autonomously processed means that after the application has been installed to the user terminal, the application may be executed locally in the user terminal without having to request information from an external application server or without having to submit information to one. Such exchange of information with the application server may be possible but the content of the exchanged information does not control progress of events in the application and therefore exchange of information with the external server is not mandatory for execution of the application. The expression user-controlled means that the user terminal in which the application is executed comprises a user interface and the user may control execution of the application by means of the user interface. The user may thus initiate and terminate running of the application, provide commands that control the order of instructions being processed in the user terminal.

The user may also pause execution of the application. A user-initiated pause refers here to a function, in which execution of the application is suspended according to a user activity detected via the user interface of the user terminal. At the time the execution is suspended, status information on execution of the application is at least temporarily saved. Accordingly, when execution of the application is resumed after the pause, the execution of the application may continue from the state where the application was when it was stopped. Some applications provide a number of programmed standstill states to which the application automatically enters after performing commands assigned to it, and in which the application remains standby for further commands by the user. Such programmed standstill states do not correspond to user-initiated pause functions, a user-initiated pause is triggered in relation to one or more activities of the user. The user may trigger pause explicitly, for example, by invoking a defined hard or soft key or menu option provided by the application. The user may trigger pause also implicitly, for example, by not performing an expected activity, like activating any of the user interface means within a predetermined period. The user-initiated pause may be triggered also while the execution is in a programmed standstill state. For example, in game applications, the user may be provided with a user-initiated pause key in a programmed standstill stage between levels of a game, or between a shared selection menu of two or more games.

Some terminal applications, like games and video applications, comprise progressive parts where application events progress sequentially from one state to another according to a scripted scheme, even without interaction with the user. For such applications the user-initiated pause function is specifically useful, because the user may easily direct his attention temporarily away from the application without causing undesired progress of events of the application in the meanwhile. Additionally, he or she may quickly return to the storyline or scheme of the application right after the pause.

The at least one of the user terminals 10, 11, 12 comprises also a browser 16 accessible to the terminal application APP-T 15. The application 15 may apply the browser 16 to invoke web pages in the server 14 connected to the network 13. The server 14 may be a web server that has an IP address and a domain name. The server 14 may also be implemented as a cloud providing a defined web service disclosed herein. The server 14 comprises a server application APP-S 17, and a database 18 for storing information for user-specific web pages that are accessible over the internet and identified by a unique web address. The server application 17 may be stored in a memory of a server and provides instructions that, when executed by a processor unit of the server perform the functions described in the following herein.

Figure 2:
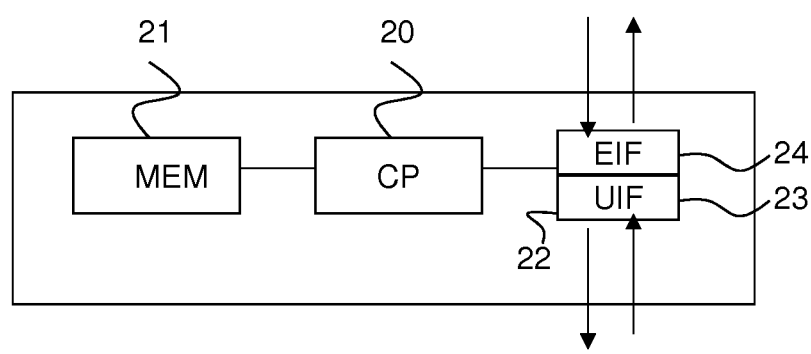
FIG. 2 shows a block diagram illustrating configuration of an exemplary user terminal or server device.

Embodiments of this invention may be implemented with a computer device, applicable as a user terminal or a server described in FIG. 1. FIG. 2 shows a block diagram illustrating configuration of an exemplary device for the purpose.

The device comprises a processor unit 20 for performing systematic execution of operations upon data. The processor unit 20 is an element that essentially comprises one or more arithmetic logic units, a number of special registers and control circuits. Memory unit 21 provides a data medium where computer-readable data or programs, or user data can be stored. The memory unit is connected to the processor unit 20. The memory unit 21 may comprise volatile or non-volatile memory, for example EEPROM, ROM, PROM, RAM, DRAM, SRAM, firmware, programmable logic, etc.

The device also comprises an interface unit 22 with at least one input unit for inputting data to the internal processes of the device and at least one output unit for outputting data from the internal processes of the device. The interface unit 22 of the device may comprise a user interface unit 23 with a keypad, a touch screen, a microphone, and equals for inputting user data and a screen, a touch screen, a loudspeaker, and equals for outputting user data. The interface unit of the device may also comprise a network interface unit 24 that provides means for network connectivity. If a line interface is applied, the network interface unit 24 typically comprises plug-in units acting as a gateway for information delivered to its external connection points and for information fed to the lines connected to its external connection points. If a radio interface is applied, network interface unit 24 typically comprises a radio transceiver unit, which includes a transmitter and a receiver, and is also electrically connected to the processing unit 20. The transmitter of the radio transceiver unit receives a bitstream from the processing unit 20, and converts it to a radio signal for transmission by the antenna. Correspondingly, radio signals received by the antenna are led to the receiver of the radio transceiver unit, which converts the radio signal into a bitstream that is forwarded for further processing to the processing unit 20. Different radio interfaces may be implemented with one radio transceiver unit, or separate radio transceiver units may be provided for the different radio interfaces.

The processor unit 20, the memory unit 21, and the interface unit 22 are electrically interconnected to provide means for systematic execution of operations on received and/or stored data according to predefined, essentially programmed processes of the device. These operations comprise the means, functions and procedures described herein for the user terminal and the application server.

In general, various embodiments of the device may be implemented in hardware or special purpose circuits, software, logic or any combination thereof. Some aspects may be implemented in hardware, while some other aspects may be implemented in firmware or software, which may be executed by a controller, microprocessor or other computing apparatus. Software routines, which are also called as program products, are articles of manufacture and can be stored in any device-readable data storage medium and they include program instructions to perform particular tasks.

While various aspects of the invention have illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

Figure 3:
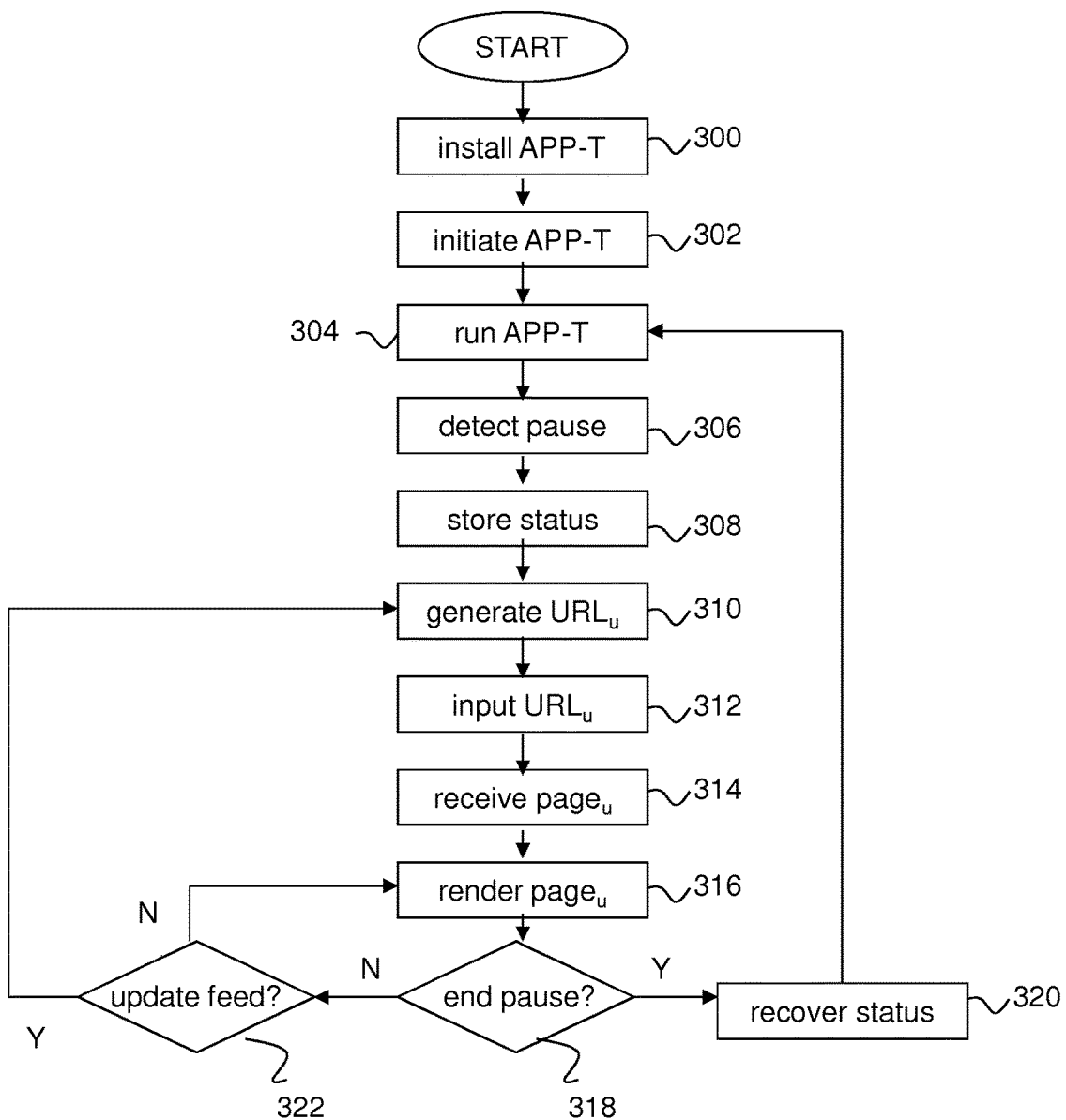
FIG. 3 illustrates a method implemented in a user terminal.

The invented procedure allows a user to immediately access and apply user specific feed information when he or she pauses the application. The procedure is a result of methods implemented interactively in inter-related system entities. The procedure of FIG. 3 illustrates an embodiment of the invented procedure by means of a method implemented in a user terminal. The procedure begins at a stage where the user terminal is switched on an operational. A terminal application may ne installed (stage 300) to the user terminal as a pre-installed native application, or downloaded to the user terminal over the air at any time during use of the user terminal. The application may be initiated (stage 302) automatically after its installation, or it may be initiated at any later stage in response to a user command or an activation request by another terminal application.

The initiated application may run (stage 304) progressively, or according to a predefined combination of progressive procedures and programmed standstill states. During execution of the application, user control functions of the application apply an output window of the user terminal. The expression output window relates here to a combination of user interface output means activated by the terminal application when it outputs application event related information to the user. In one aspect, the output window comprises a region applied by the terminal application in a display screen of the user terminal. The output window may also comprise audio functions of a loudspeaker in the user terminal, or vibration function in the body of the user terminal. These elements are applied or applicable to the terminal application when it runs in the foreground of the user terminal. When execution of the application changes to foreground and background states, the output window is activated and disabled correspondingly.

At some point of execution, a user-initiated, explicit or implicit pause is detected (stage 306). Before suspending the execution, the application stores status information (stage 308). Status information may be saved with application parameters that correspond to the state of execution of the application. In response to the user-initiated pause, the application generates (stage 310) a web address to a web page that contains user-specific feed information and is retrievable in the server accessible to the user terminal.

As an example, let us consider that the application is a game that comprises native and scripted parts. The game may comprise a native component that allows the game to embed web pages. In the scripted code, the game creates an instance of the native component that loads feed information targeted to the player of the game. The user-specific feed information is invoked by means of a bootstrap page. The bootstrap page is identified with a web address that comprises a base element and a user-specific element. The base element of the web address may identify the domain of the application server. The base element may additionally identify at least a specific channel that provides the user-specific feed information in the domain of the application server. Also other elements associated to the data strucures applied in the application server may be included in the base elements. For example, an URL (Uniform Resource Locator) part of the base element of the game could be:
http://cloud.gameprovider.com/content/feed The user-specific element comprises at least one parameter that enables identifying the user. Advantageously, the user-specific element comprises a number of further parameters that allow adjusting the feed information to the specific rendering environment of the user. For example, the parameters required for the user-specific part of the bootstrap page may represent characteristics of the user terminal, characteristics of the game that was paused to invoke the web page, details of the specific channel that provides the user-specific feed information, and the like. A web page of an exemplary bootstrap page of the game may thus be
http://cloud.gameprovider.com/content/feed/
?p1=data1&p2=data2&p3=dat 3&p4=data4
where parameters p1 to p4 illustrate exemplary parameters with given exemplary parameter values data 1 to data 4. In order to be able to provide the values, the application may comprise a component that determines locally the user terminal related information. For example, the game may comprise a native component that reads user terminal related information from the operating system of the user terminal and applies them in generation of the bootstrap page web address. The application may also comprise a component for launching execution of other programs. For example, the application may comprise a functionality to input a given a web address and open it with an external browser. The application may also comprise a functionality to input identification of another program and initiate its execution in the user terminal.

When the bootstrap page web address is input to a browser (stage 312), the server of the bootstrap page and an appropriate information source therein is located. A response comprising feed information specific for the user is received (stage 314) from the server and output (stage 316) via the user interface of the user terminal. The web page may be output until the pause ends. As shown in FIGS. 4A and 4B, the user specific information is output in the same output window that the terminal application applies during its foreground operations. This means that feed information and application information may be considered to take turns in a shared output sphere; when the terminal application runs in the foreground, there is no feed (FIG. 4A). In response to a user-initiated pause 40, the output window is populated with user-specific feed information (FIG. 4B). In this way, output of the feed content does not disrupt the user's focus from the application events, and at the same time the interactive user experience from the social community of users of the application is achieved. In addition, the arrangement is optimal for small display screens of mobile user terminals, where no separate output window for additional ticker information can be provided. The same arrangement may thus be applied to provide feed information to users of mobile devices as well as of large display screen configurations.

Returning back to FIG. 3, the pause is typically configured to end (318) in response to a user-given command. However, the pause may be configured to end automatically, for example when a defined time limit is exceeded. When the pause ends, the terminal application recovers the stored status information (stage 320) and resumes execution of the application events (to stage 304).

The response from the server may comprise also information that controls output of the user-specific information in the user terminal. In order to ensure that current information is always displayed, the response may indicate to the terminal application a validity time of the content. The terminal application may then query the server for content update when, for example, a given time interval from the previous information delivery has expired, or when time counted from a given timestamp exceeds a predefined threshold. The terminal application may monitor validity of the content of the feed (stage 322). When the content expires, the terminal application may return to stage 310 by reloading the bootstrap page.

The user-specific feed information may comprise simple output elements that may be rendered in the user terminal, like images, text data, audio or video clips. The feed information may also comprise image banners with links that are opened by the user clicking the image banner in the display screen. Content of the user-specific feed information will be discussed in more detail in the following with description of the operation of the server element.

As discussed, in some conventional systems, format and extent of content to be provided to the user may be tailored according to the user terminal applied for rendering the content. Such tailoring does not, however, provide user-specific feed information referred to herein. The term refers to information that comprises at least one element that is extracted for a specific user from a stream of data items generated from application events of a group of other users. For user-specific feed information this group is selected explicitly by the user, or implicitly for the user based on recorded user activity of the specific user.

FIG. 5 illustrates the basic operating principle of the application server 14 of FIG. 1. The server 14 receives a stream of event data items $Ed_i$. An event data item $Ed_i$ comprises information that identifies a user and an event occurred to the user during execution of the application. The server maintains a condition $F(Ed_i)_{user1}$ that is specific for a served first user. The server uses the condition $F(Ed_i)_{user1}$ to extract from the stream of received event data items $Ed_i$ event data items $(Ed_i)_{user1}$ that are linked to the first user by means of the user-specific condition $F(Ed_i)_{user1}$. These event data items are used to create a web page for the user-specific feed information, and provided with a user-specific web address. When an application in a user terminal invokes this web address, the web page with the user specific feed information is returned.

The stream of data items comprises information created by the application during execution of the application. The term steam of event data items thus refers to a stream of data items wherein at least one data item of the stream results from an event that is not initiation or termination of execution of the application. For example, in the earlier described game example, an event may correspond to a new game score achieved by a user, purchase of a game enhancement by the user, challenge activated during game by the user, etc. As another example, an image storage application may be configured to create event data items the identify the user accessing a specific image file storage and includes details of the folders accessed by the viewer. By means of the user-specific feed, a friend pausing from an interactive application may be informed of the event and leap to view and comment the content of the same image folder. Advantageously involved terminal applications are configured with an application-specific ruleset that defines the types of application events that generate creation and transmission of a corresponding event item.

For the user-specific condition $F(Ed_i)_{used1}$ the server stores for the first user first context data that links the user to a group of one or more other users. A link from the first user to another user may be created when the first user explicitly identifies another user as a linked user. The application may also monitor activity of its users and comprise an algorithm that based on monitored activities, links users to each other. The application may also import social network information from other applications and apply the same user links for the first context data of the user-specific condition $F(Ed_i)_{user1}$. These mechanisms may be used separately or in combination.

The enhanced user experience may be expanded also to other applications. In addition to receiving event data items from users of the first application, the server may be configured to collect event data items from at least one linked application. For example, two or more games may be linked by means of a feed server that receives information on user events occurring in any of these games. The applications may be linked, for example, by means of URI (Uniform Resource Identifier) scheme that then provides second context data for the user-specific condition $F(Ed_i)_{user1}$ of the first user. Alternatively, the user may be provided with a user interface function through which he or she may communicate with the server such that applications may be explicitly linked together.

Furthermore, the autonomously running applications may generate and send to the server also event data items that are not relevant for the user specific feed information, at least not similarly to all users of the feed information. Advantageously, the server may be configured to store third context data that links the first user to a group of application event types in the applications the first user is already linked to. The event types relevant for the application may be derived by analyzing user activity and behavior of the first user with an algorithm. Alternatively, the first user may be provided with a user interface function through which he or she may explicitly control the type of events to be visible in the feed information. Also other types of implicitly of explicitly provided context information may be applied for determining the user-specific condition $F(Ed_i)_{user1}$ of the first user.

Links applied in context data collection must be derivable from individual event data items received in the server. FIG. 6 illustrates an example of an event data item, applying the first, the second and the third context data described above. The received event data item comprises a data block 60 that identifies a user to whom the event occurred, a data block 61 that identifies the application during execution of which the event occurred, and a data block 62 that identifies the type of event in the application.

In the inter-related operation of the user terminal and the server, the task of the terminal application was to trigger retrieval and output of user-specific feed information in the user terminal in response to a user-initiated pause. The task of the server is to intelligently collect event data information and extract topical and meaningful event data items of other users from the massive streams. As a result of this, a more interactive and social user experience may be provided for users of autonomously processed applications without imposing additional requirements to the extent of information exchanged between the autonomous applications and the server. The same arrangement may be applied in user terminals with limited display means and in user terminals capable of simultaneously displaying a number of windows. This significantly streamlines version management and technical implementation of user-specific feed information to applications.

Figure 7:
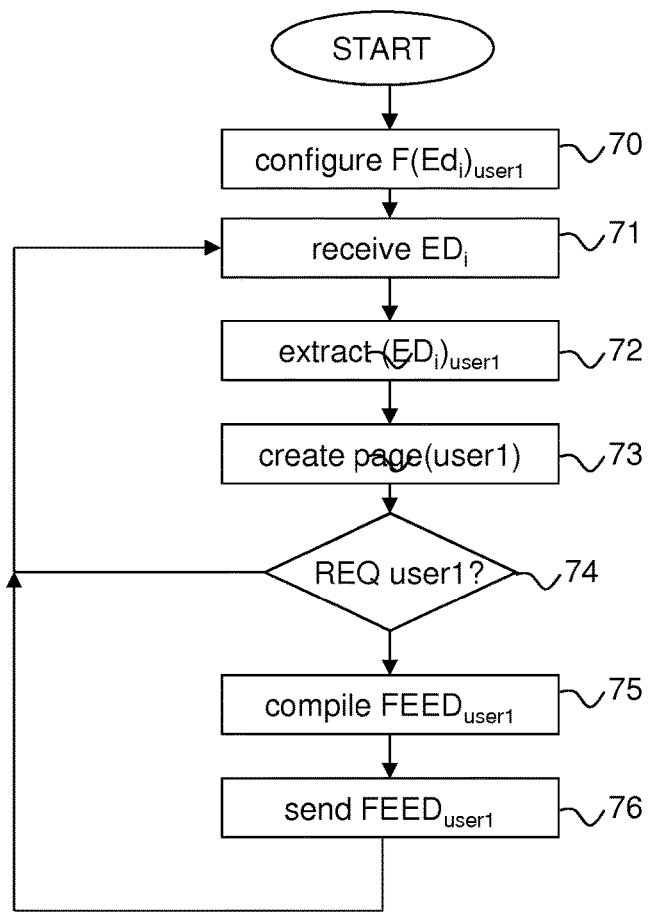
FIG. 7 illustrates a method implemented in the server.

The procedure of FIG. 7 illustrates an embodiment of the invented procedure by means of a method implemented in the server 14. The procedure begins at a stage where the server is switched on an operational. The server is first configured with a user-specific condition $F(Ed_i)_{user1}$ (stage 70) of the first user. The condition applies at least first context data that links the first user to a group of one or more other users. The condition may apply also second context data that links the first user to a group of two or more one or more other users, and/or third context data that links the user to a group of application event types of the application. The condition may apply also further context data elements, as discussed with FIG. 6. The first context data may be collected with any of the means discussed in more detail with FIG. 5. The server is then ready to receive (stage 71) a stream of event data items. Event data items comprise information that identifies a user that caused the event and the event that occurred to this user during execution of the application. The server applies the user-specific condition $F(Ed_i)_{user1}$ to extract from the stream of event data items those event data items that are linked to the first user by means of first context data and possible further context data applied in stage 70. The extracted information is associated (stage 73) with a defined, user-specific web address such that when a browser request from the user terminal of the user is received (stage 74), a web page comprising the user-specific feed information $FEED_{user1}$ may be compiled (stage 75). The association may be explicit such that a complete web page is stored in the server. The association may be also implicit such that elements of the web page are compiled in the server in response to the detected browser request in stage 74. The compiled web page may then be returned (stage 75) in reply to the user terminal.

Figure 8:
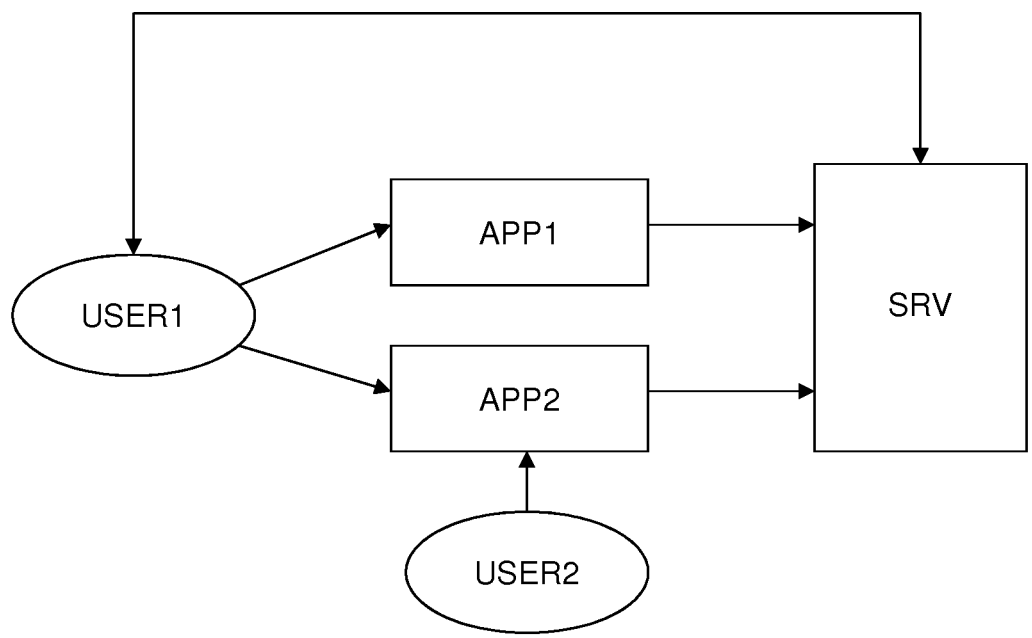
FIG. 8 illustrates a further embodiment of the invention.

FIG. 8 illustrates an embodiment of the invention that further enhances the interactive user experience of an autonomously processed application without, however, comprising the autonomous nature of the terminal applications. In the embodiment a first user 80 is linked to at least two applications, a first application 81 and a second application 82. In addition, the first user is linked to at least to one other user, a second user 83 that is linked at least to the second application 82. The first and the second application send event data items generated during execution by their users 80, 83 to a server 84. The server extracts event data items to user-specific feed information, and the first user retrieves the user-specific feed information from the server in the manner disclosed above in FIGS. 1 to 7. In the embodiment, the second application may be configured to include to its event data items a pointer to an in-application state where the event occurred. For example, the second application 82 may be the earlier mentioned exemplary game application and the in-application state may be a defined level in the game. The event data item may comprise an event type 'new high score' and a pointer to the level of the game in which the new high score was achieved. The server may use the pointer to generate to the user-specific feed of the first user an image banner and an associated web link that launches the game application from the in-application state indicated by the pointer.

For example, in the exemplary game application context, let us assume that the first application 81 is a first game and the second application 82 is a second game. When the second user gets a new high score in level X of the second game, the second application 82 creates an event data item that indicates the identity of the second user, the second application, the event type and a pointer to level X of the second game. The next time the first user 80 pauses to request user-specific feed information from the server 84, the server feeds the first user information that states that the linked second user has achieved a new high scope in level X of the other game. In addition the server may include to the feed a web link to the referred level X of the second game. if the first user wishes, he or she can now try to compete with the second user by launching the other game from the feed. As discussed above, the context between the games may be provided in the form of URI schema. The URI schema may be applied in provision of the web link, correspondingly. For example if the URI schema of the linked applications is
gameinfo://
the weblink included to the feed of the first user may be,
gameinfo-ver:///launch/level/X/?token.

Figure 9:
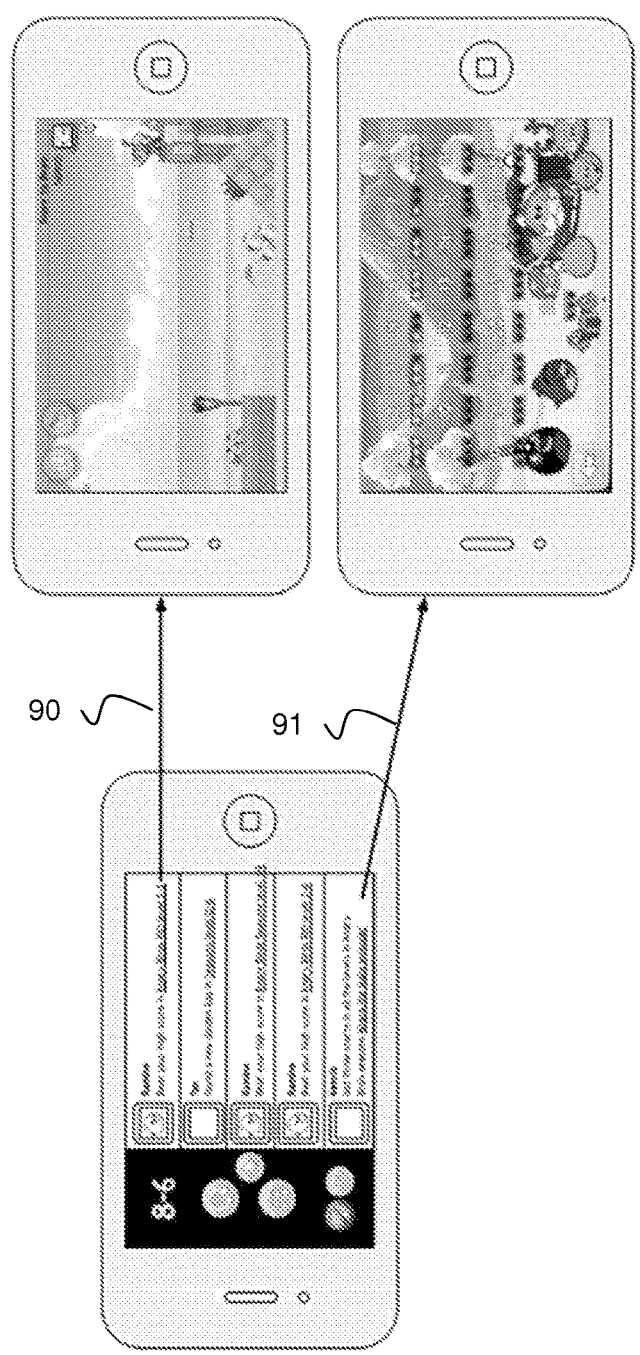
FIG. 9 illustrates a display screen of an output window of a user of FIG. 8.

FIG. 9 illustrates a display screen of the output window of the first user 80 in the game application example of FIG. 8. The output window displays user-specific feed information that is created on the basis of an application event in response to an activity of a second user linked to the first user by means of first context data. The shown feed in displayed to the first user in response to a game pause initiated by the while playing the first game Angry Birds Classic. The displayed feed information challenges the first user by informing the user that his friend Ramine has achieved a new high score in level 3-2 of Angry Birds Rio. The feed may also provide web link 90 for invoking a web page that launches the identified level 3-2 of Angry Birds Rio. In the same feed, the first user may be informed that his other friend Henrik has gotten three starts in all levels in Angry Birds Season game. The feed may also provide another web link 91 for invoking a web page that launches the respective episode of the Angry Birds Seasons game. The first user has now a choice to continue his autonomous gaming in the first game Angry Birds Classic or to directly leap by clicking the link to the specific level in the Angry Birds Rio where his score was beaten by his friend Ramine or to Angry Birds Season where Henrik caused an event with his recent achievement. By means of the embodiment, the interaction between the users and the games may be improved in a meaningful manner without essentially increasing the amount of information exchanged in the system or compromising the autonomous character of the game applications.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method, comprising:
    storing for a first user, first context data for linking the first user to one or more other users;

receiving a stream of event data items, an event data item comprising information that identifies a user to whom an event occurred and the event that occurred during execution of an application;

using the first context data of the first user to extract event data items of the one or more other users linked to the first user from the stream of event data items;

in response to a request from a user terminal of the first user, compiling, with the extracted event data items of the one or more other users, a user-specific web page with a defined user-specific web address, the user-specific web page comprising user-specific feed information for the first user;

forwarding the user-specific web page to the user terminal of the first user in response to the first user pausing execution of the application;

running an autonomously executed user-controllable application in the user terminal, user control functions of the application applying an output window of the user terminal;

in response to the user-initiated pause function in the user terminal, invoking the user-specific web address to the user-specific web page containing the user-specific feed information; and outputting the user-specific feed information in said output window of the user terminal during the user-initiated pause.

2. A The method according to claim 1, characterized by invoking the web address by:
generating a web address that comprises a base element that identifies a domain of an application server, and a user-specific element that enables identification of the user; and
inputting the generated web address to a browser of the user terminal.

3. The method according to claim 1, characterized by:
monitoring validity of the feed content; and
re-invoking the web address in response to expiry of the validity of the web page.

4. The method according to claim 1, characterized by:
storing for a first user second context data for linking the first user to one or more applications; and
using also the second context data to extract event data items of the one or more other users linked to the first user from the stream of event data items.

5. The method according to claim 4, characterized by the second context data comprising a uniform resource identifier (URI) schema accessible to the user.

6. The method according to claim 1, characterized by:
storing for a first user third context data for linking the first user to one or more event data types; and
using also the third context data to extract event data items of the one or more other users linked to the first user from the stream of event data items.

7. A system, comprising:
a user terminal; and
a server configured to:
store for a first user, first context data for linking the first user to one or more other users;
receive a stream of event data items, an event data item comprising information that identifies a user to whom an event occurred and the event that occurred during execution of an application;
use the first context data of the first user to extract event data items of the one or more other users linked to the first user from the stream of event data items;

in response to a request from a user terminal of the first user, compile, with the extracted event data items of the one or more other users, a user-specific web page with a defined user-specific web address, the user-specific web page comprising user-specific feed information for the first user; and
forward the user-specific web page to the user terminal of the first user in response to the first user pausing execution of the application,
wherein the user terminal is configured to:
run an autonomously executed user-controllable application in the user terminal, user control functions of the application applying an output window of the user terminal;
in response to the user-initiated pause function in the user terminal, invoke the user-specific web address to the user-specific web page containing the user-specific feed information; and
output the user-specific feed information in said output window of the user terminal during the user-initiated pause.

8. The system according to claim 7, wherein the user terminal is configured to invoke the web address by:
generating a web address that comprises a base element that identifies a domain of an application server, and a user-specific element that enables identification of the user; and
inputting the generated web address to a browser of the user terminal.

9. The system according to claim 7, the user terminal further being configured to:
monitor validity of the feed content; and
re-invoke the web address in response to expiry of the validity of the web page.

10. A computer program, embodied on a non-transitory computer readable storage medium, the computer program configured to control a processor to perform a process, comprising:
storing for a first user, first context data for linking the first user to one or more other users;
receiving a stream of event data items, an event data item comprising information that identifies a user to whom an event occurred and the event that occurred during execution of an application;
using the first context data of the first user to extract event data items of the one or more other users linked to the first user from the stream of event data items;
in response to a request from a user terminal of the first user, compiling, with the extracted event data items of the one or more other users, a user-specific web page with a defined user-specific web address, the user-specific web page comprising user-specific feed information for the first user;
forwarding the user-specific web page to the user terminal of the first user in response to the first user pausing execution of the application;
running an autonomously executed user-controllable application in the user terminal, user control functions of the application applying an output window of the user terminal;
in response to the user-initiated pause function in the user terminal, invoking the user-specific web address to the user-specific web page containing the user-specific feed information; and
outputting the user-specific feed information in said output window of the user terminal during the user-initiated pause.

11. The computer program according to claim 10, characterized by:
   storing for a first user second context data for linking the first user to one or more applications; and
   using also the second context data to extract event data items of the one or more other users linked to the first user from the stream of event data items.

12. The computer program according to claim 10, characterized by:
   storing for a first user third context data for linking the first user to one or more event data types; and
   using also the third context data to extract event data items of the one or more other users linked to the first user from the stream of event data items.

13. The computer program according to claim 11, characterized by the second context data comprising a uniform resource identifier (URI) schema accessible to the user.

14. The computer program according to claim 10, characterized by invoking the web address by:
   generating a web address that comprises a base element that identifies a domain of an application server, and a user-specific element that enables identification of the user; and
   inputting the generated web address to a browser of the user terminal.

15. The computer program according to claim 10, characterized by:
   monitoring validity of the feed content; and
   re-invoking the web address in response to expiry of the validity of the web page.

* * * * *